Feb. 7, 1939. H. A. ADAMS ET AL 2,146,135
APPARATUS FOR PRODUCING STEREOSCOPIC EFFECTS IN MOTION PICTURES
Filed Aug. 3, 1936 4 Sheets-Sheet 1
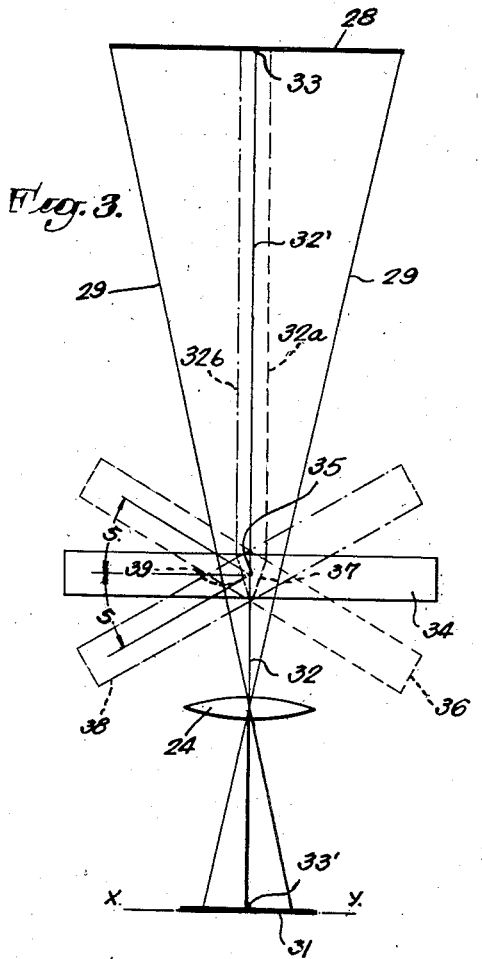
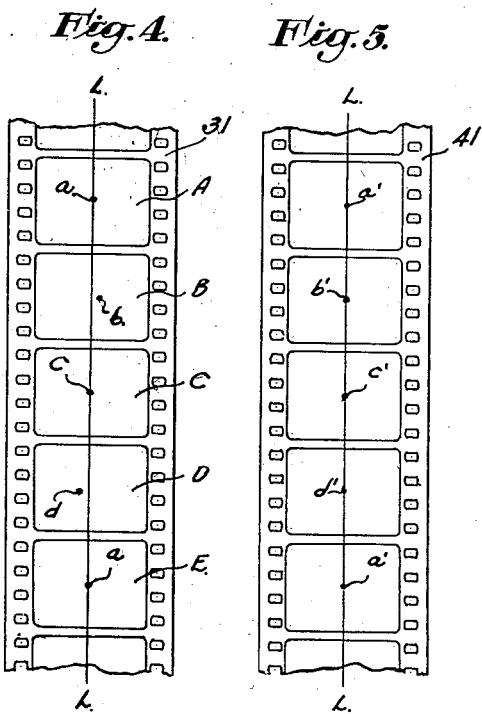
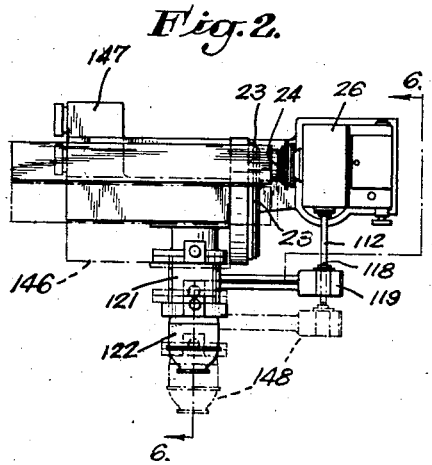
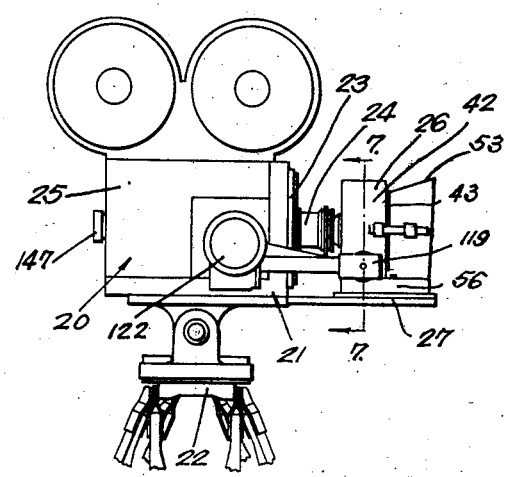
INVENTORS:
HAROLD A. ADAMS
RALPH D. LEMERT,
ATTORNEY.

Feb. 7, 1939.   H. A. ADAMS ET AL   2,146,135
APPARATUS FOR PRODUCING STEREOSCOPIC EFFECTS IN MOTION PICTURES
Filed Aug. 3, 1936   4 Sheets-Sheet 2

INVENTORS:
HAROLD A. ADAMS,
RALPH D. LEMERT,
By Fred W. Lamm
ATTORNEY.

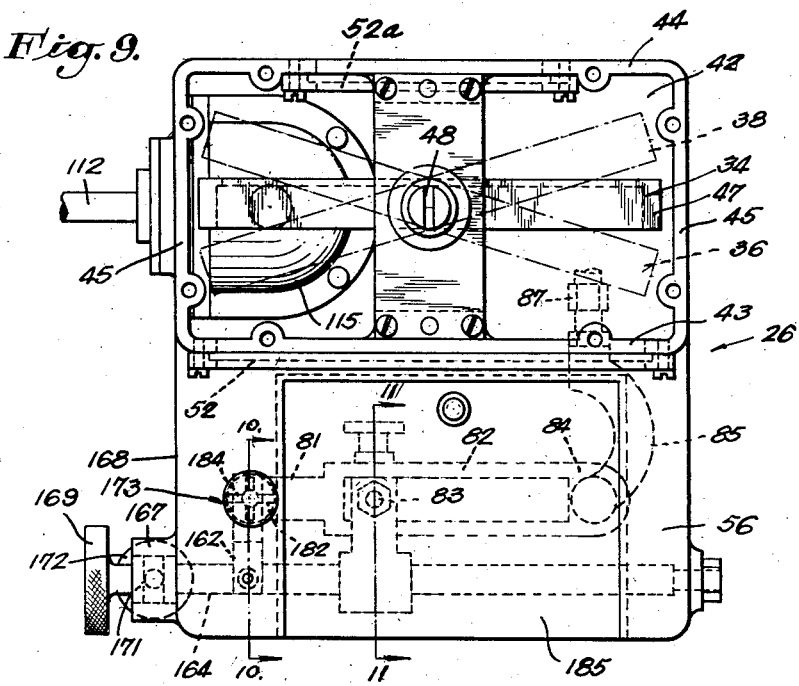
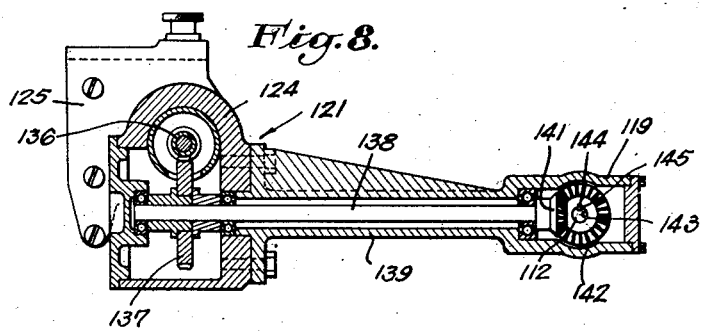
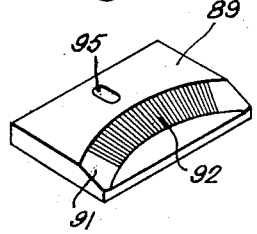
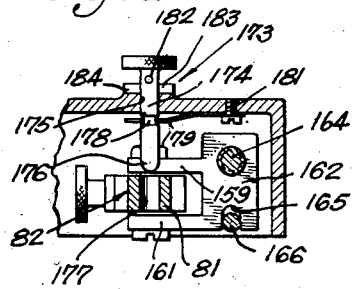
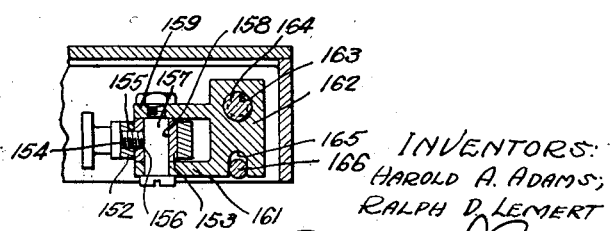

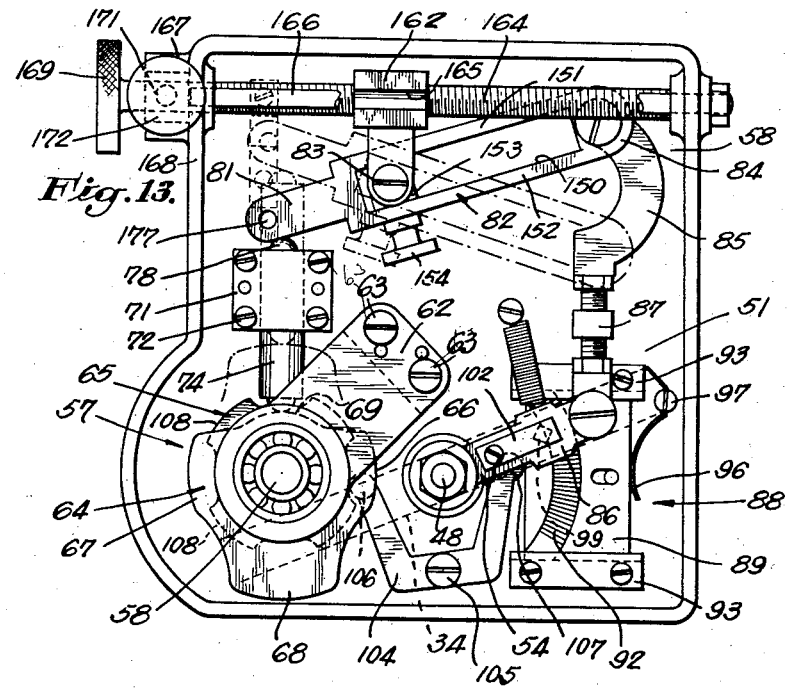
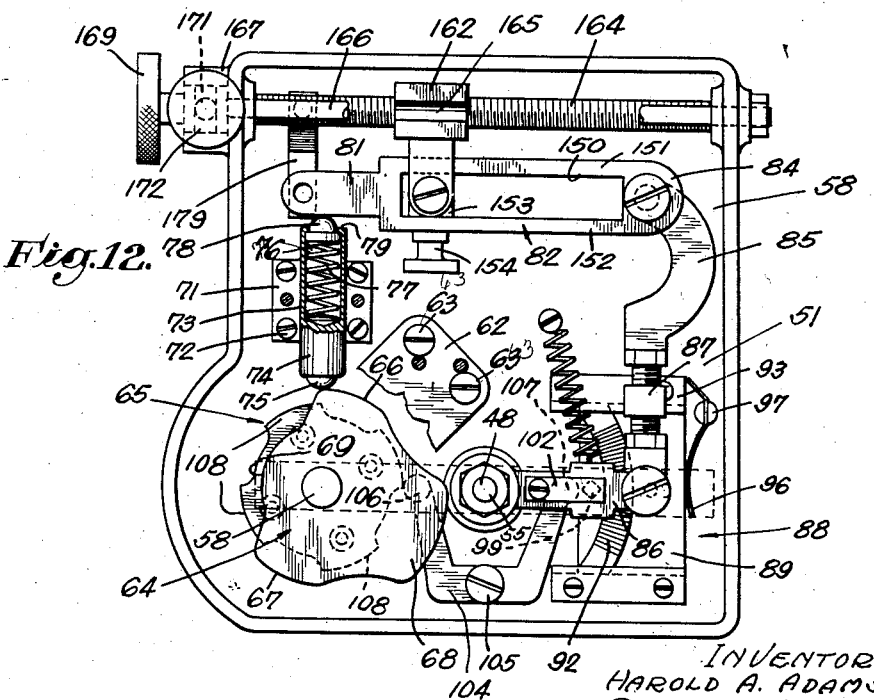

Patented Feb. 7, 1939

2,146,135

UNITED STATES PATENT OFFICE 2,146,135

APPARATUS FOR PRODUCING STEREOSCOPIC EFFECTS IN MOTION PICTURES

Harold A. Adams, Bakersfield, and Ralph D. Lemert, Los Angeles, Calif.

Application August 3, 1936, Serial No. 93,976

3 Claims. (Cl. 88—16.6)

Our invention relates to the art of producing motion pictures, and relates in particular to an apparatus for producing in motion pictures the appearance of depth, ordinarily referred to as stereoscopic effects.

It is an object of the invention to provide an apparatus for producing motion pictures, wherein the light rays passing from a scene or object are subjected to different conditions of refraction during the exposure of consecutive frames of a motion picture film, the result being that the optical axis of the camera is shifted back and forth in timed relation to the bringing of consecutive frames of the motion picture film into focal position relative to the camera lens.

It is a further object of the invention to provide an apparatus for producing motion pictures, wherein refracting means are employed to intermittently and alternately offset the optical axis of the lens system of a motion picture camera, with the result that adjacent frames of a motion picture film photographed in such camera have thereto. The invention also includes means whereby these images are subsequently rectified, or brought into alignment prior to the viewing thereof, so that the image will not appear to jump back and forth in the vision of the viewer. The shifting of the images carried in consecutive frames of a positive film may be accomplished in the projection of such images onto a screen, or in the printing of a positive film from a negative having images in staggered relation the images may be moved into longitudinal alignment on the motion picture film which is to be used for projection purposes.

It is a further object of the invention to provide an apparatus for producing motion pictures, wherein a refracting member, such as an optical flat lens, is disposed in a position crossing the optical axis of the lens of a camera, and during the taking of a motion picture is swung through an angle relative to the optical axis of the lens in a timed relation to the step-by-step advancing movement of the film relative to the lens of the camera. In the preferred practice of the invention the refracting member is disposed in a position normal to the optical axis of the lens during the exposure of one frame of the motion picture film, is swung to the right during the exposure of the first succeeding frame, is returned to normal position during the exposure of the second succeeding frame, and is then swung to the left during the exposure of the third succeeding frame, this cycle being repeated as the exposure of consecutive frames of the motion picture film proceeds.

It is an object of the invention to provide a camera having means for supporting a refracting member in a position crossing the optical axis of the camera lens, together with means for swinging the refracting member in timed relation to the operation of the film moving mechanism and therefore in timed relation to the advancing movement of the film through the camera.

It is a further object of the invention to provide an attachment incorporating the foregoing features, which may be readily secured to the exterior of a standard motion picture camera.

It is a further object of the invention to provide a motion picture camera having a refracting member disposed in a position crossing the optical axis of the camera lens and having adjustable means for swinging the refracting member in timed relation to the movement of the motion picture film in the camera, so that the refraction of the light rays passing from the image or object to the motion picture film in focal position relative to the lens may be refracted in accordance with conditions under which the motion picture is being taken.

Further objects and advantages of the invention will be made evident throughout the following part of the specification.

Referring to the drawings, which are for illustrative purposes only,

Fig. 1 is an elevational view of a camera equipped with a mechanism for the practice of our invention.

Fig. 2 is a plan view corresponding to Fig. 1.

Fig. 3 is a diagrammatic view showing essential elements of the invention and indicating the results obtained by partial rotation of a refracting member.

Fig. 4 is a view of a portion of motion picture film photographed in accordance with the principles explained relative to Fig. 3.

Fig. 5 is a view of a portion of motion picture film on which the consecutive images have been rectified or aligned.

Fig. 8 is a sectional view taken on a plane indicated by the line 8—8 of Fig. 6.

Fig. 9 is an enlarged plan view of the refracting means, with the cover plate of the casing thereof removed.

Fig. 10 is a fragmentary section taken as indicated by the line 10—10 of Fig. 9.

Fig. 11 is a fragmentary section taken as indicated by the line 11—11 of Fig. 9.

Fig. 12 is a bottom plan view of the refracting device shown to enlarged scale in Fig. 9, with the bottom cover plate removed therefrom.

Fig. 13 is a bottom plan view similar to Fig. 12, but showing the parts of the mechanism in different positions from the positions thereof disclosed in Fig. 12.

Fig. 14 is a perspective view of the locking plate employed to lock the lever of the refracting means.

Figure 6:
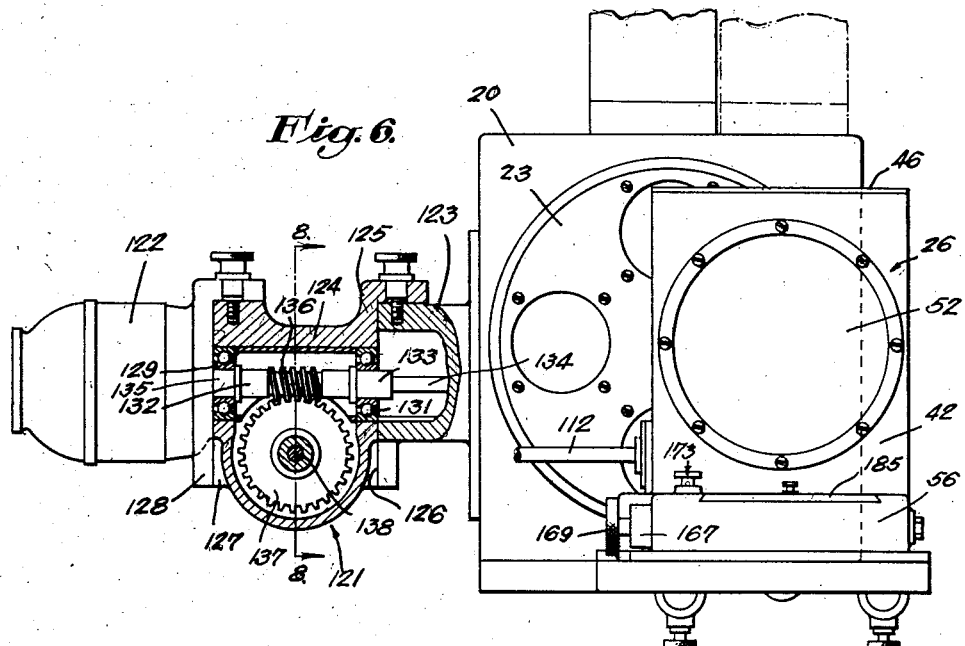
Fig. 6 is an enlarged, partly sectioned view taken as indicated by the line 6—6 of Fig. 2.

In Figs. 1 and 2, which are schematic in character, we show a camera 20 of a well known form having a base structure 21 secured to a tripod 22. The base structure 21 carries a turret 23 having an objective lens 24, and mounted on the base structure 21 rearwardly of the turret 23 is a casing 25 which is laterally slidable relative to the turret 23 so that a film advancing mechanism within the casing 25, or a range finder or focusing device, also within the casing 25, may be brought into alignment with the optical axis of the lens 24.

A casing 26 is secured in a plane in front of the lens 24 by a support 27 which is connected to the base 21 of the camera, this casing 26 including a refracting means and actuating means therefor, the characteristics of which will be readily understood from the following explanation of Fig. 3. In Fig. 3 we show an image or object 28 from which a light image is projected as indicated by lines 29 through the objective lens 24 of the camera 20 to a focal plane x—y, wherein a negative motion picture film 31 is exposed to the light image. The optical axis of the lens 24 is indicated by a line 32 which likewise represents the path of light rays from a center point 33 of the object 28 to a center point 33' of the exposed area on the film 31. In a position crossing the optical axis 32, preferably between the lens 24 and the object 28, we place a refracting member 34, which, in the preferred practice of the invention, consists of an optical flat glass disposed in the casing 26.

In Fig. 4 we show a portion of the film 31 having frames A, B, C, D, and E produced in the customary manner by exposing portions of the film 31 in consecutive order before the lens 24, in timed relation to the operation of a shutter mechanism forming an ordinary part of the camera assembly. When a frame of the film 31, such as the frame A, is exposed in the focal position indicated by the line x—y of Fig. 3, the refracting means 34 may be disposed in an initial or primary position, such as a position normal to the optical axis 32. Accordingly, there will be no refraction of light rays passing from the object 28 to the film 31, and the image of the point 33 will be transmitted along the optical axis 32 to the point 33' of the frame A. Accordingly, an image of the point 33 will appear in the center of the frame A at a. During the movement of the film 31 to bring the frame B into focal position, the refracting member 34 is swung on an axis of rotation 35 into a rightward position indicated by dotted lines 36. Due to refraction of light by the refracting member 34, the optical axis 32 will be offset rightwardly at 37, and the forward portion of the optical axis 32 will now extend forwardly from the refracting member 34 as indicated by the dotted line 32a. The center point 33' of the focal plane x—y will now receive light which passes from the object 28 along the line 32a, and the center point 33 of the object 28 will be recorded to one side of a center line L—L as indicated at b in the frame B of the film 31. The film 31 is then advanced to the frame C, and during its advancing movement the refracting member 34 is returned to its intermediate or non-refracting position in which it is shown in full lines in Fig. 3. Accordingly, the center point 33 of the object 28 will appear in the center of the frame C as indicated at c in Fig. 4. While the film 31 is being advanced to the frame D, the refracting member 34 is swung leftwardly into the position in which it is indicated in Fig. 3 in dotted lines 38. In this position 38 the refracting member 34 will offset the optical axis 32 at 39 so that the forward portion of the optical axis will extend forwardly from the refracting member 34, as indicated by the broken line 32b, this causing the image of the point 33 of the object 28 to be offset as indicated at d in the frame D in a direction opposite to the offset of the center point at b in frame B. The cycle of operations of the refracting member 34, as explained relative to frames A to D inclusive of the film 31, is then repeated in conjunction with the exposure of the next four frames of the film 31, starting with the frame E wherein the center point 33 starts again at the centralized position a indicated in the frame E. The action of the refracting means 34 in shifting the paths along which light rays may pass from the object 28 to the focal plane x—y, for example, from the rectilinear forward portion 32' of the optical axis 32 to the offset portions 32a and 32b, has the effect of viewing the image in consecutive frames of the motion picture film first along a central axis, then from one side, then again from the central axis, and finally from the opposite side of the central axis. Assuming that the object 28 is stationary, the side images b and d will be different from each other and from the centralized images a and c.

A positive film 41, Fig. 5, may be prepared from the negative film 31, and in order to prevent the images from jumping back and forth in the vision of the viewer, the laterally offset images are rectified or centralized so that the center points of all of the images of the consecutive frames will lie on the longitudinal line L—L. Accordingly, the respective images of the center point 33, Fig. 3, which appear at a, b, c, and d, in Fig. 4, will now appear in the positions indicated by a', b', c', and d' in the positive film 41, so that when the respective frames are viewed in a viewing device or are viewed by projecting them into a screen, the motion picture image will stand steady upon the screen.

Figure 7:
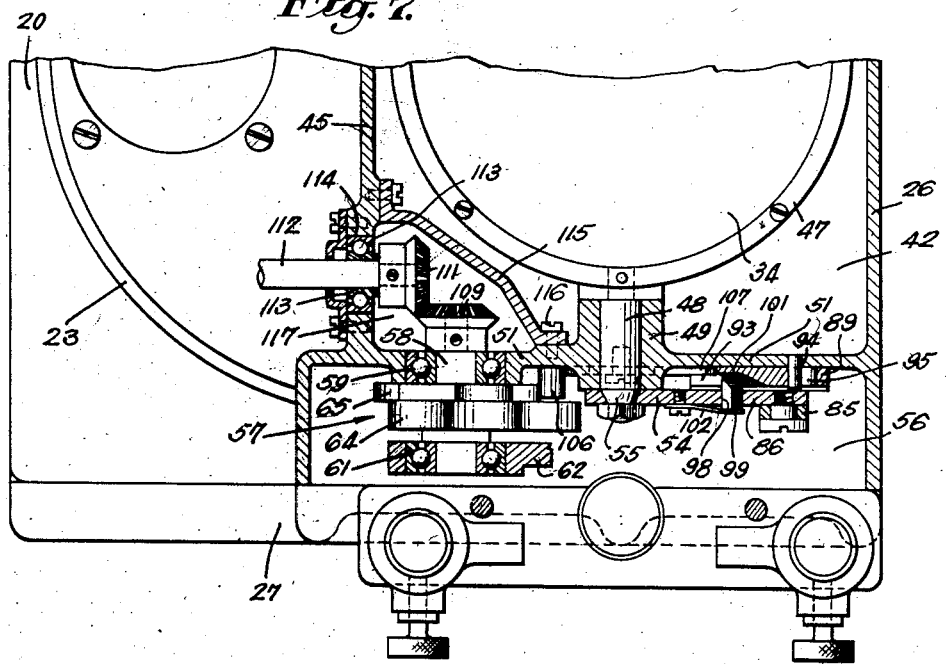
Fig. 7 is an enlarged, fragmentary, cross-sectional view taken on a plane indicated by the line 7—7 of Fig. 1.

As best shown in Figs. 6, 7, and 9, the casing 26 has an upper chamber 42 defined by front and rear walls 43 and 44 and side walls 45. The upper wall of the chamber 42 consists of a removable cover plate 46, Fig. 9 showing the chamber 42 with the cover plate removed therefrom. The refractory member 34 is mounted in a circular holder 47 secured to the upper end of a shaft 48 which projects through a bearing 49 carried in the lower wall 51 of the chamber 42, in the manner best shown in Fig. 7. The holder 47 supports the refracting member 34 on the optical axis of the lens 24, and windows of glass 52 and 52a are provided in the front and rear walls 43 and 44 of the chamber 42 through which the light image from the object may pass to the lens and then to the focal plane of such lens. As indicated in Fig. 1 by dotted lines 53, a sun shade may be secured to the front wall 43 of the chamber 42.

To swing the refracting member 34 from its intermediate position to the rightward and leftward positions thereof indicated by dotted lines 36 and 38 in Figs. 3 and 9, a lever 54 is connected to the lower end 55 of the shaft 48, this lever extending within a lower chamber 56 of the casing 26, which chamber 56 projects forwardly in a plane disposed below the lower wall 51 of the chamber 42. The lever 54 is swung through positions corresponding to the desired positions of the refracting member 34 by means of a cam mechanism 57 shown in Figs. 7, 12, and 13. This cam mechanism 57 includes a shaft 58, the upper portion of which is carried in a bearing 59 supported in the lower wall 51 of the chamber 42, and the lower end of which is carried in a bearing 61 supported in vertical alignment with the bearing 59 by means of a bracket 62 which, as best shown in Fig. 13, is secured by means of screws 63 to the lower face of the wall 51. The shaft 58 carries a primary cam 64 and a secondary cam 65. The primary cam 64 has diametrically opposed, intermediate lobes 66 and 67, a high lobe 68 disposed between the lobes 66 and 67, and a low lobe 69 diametrically opposed to the high lobe 68. A cam follower guide member 71 is secured to the wall 51 by means of screws 72. This guide member 71 has an opening 73 radially aligned with the primary cam 64 in which a cam follower 74 is slidable, so that the front rounded end 75 thereof will ride over the lobes 66 to 69 inclusive of the primary cam 64 as such cam is rotated. The rearward end of the cam follower 74 has a chamber 76, as shown in Fig. 12, in which a spring 77 forces an engagement member 78 outwardly so that it will normally engage a shoulder 79 formed at the rearward end of the chamber 76. The engagement member 78 of the cam follower 74 engages the forward end 81 of a lever 82 which is fulcrumed on a pivot means 83 so as to swing in a substantially horizontal plane from the position in which it is shown in full lines to the angular position in which it is shown in Fig. 13. The rearward end 84 of the lever 82 is connected by a link 85 with the other end 86 of the lever 54 which is connected to the vertical shaft 48 for the purpose of supporting and swinging the refracting member 34. For the purpose of adjustment of the length of the link 85, it includes a turnbuckle type screw 87.

When either intermediate lobe 66 or 67 of the cam 64 is in engagement with the cam follower 74, the lever 82, the lever arm 54, and the refracting member 34 will be in intermediate position, as shown in Fig. 12. As shown in Fig. 13, when the cam follower 74 is respectively in engagement with the low and high lobes 69 and 68, the levers 82 and 54 and the refracting member 34 will be in their rightward and leftward positions. In Fig. 13 the lever members 82 and 54 are shown in "their rightward positions"; that is, they are in such positions that the refracting member 34 will be held in the rightward position shown in dotted lines 36 in Figs. 3 and 9. Since the cam 64 has four lobes of the character previously described, one complete revolution thereof produces a complete cycle of movement of the refracting member 34 from intermediate position to rightward position, back to intermediate position, and then to leftward position.

Locking means 88 are provided for holding the refracting member 34 from vibration during the time it is in its intermediate, rightward, and leftward positions. This locking means 88 we have incorporated with the lever arm 54. It includes a block 89, such as shown in perspective in Fig. 14, having an arcuate and conical wall 91 formed with grooves or serrations 92. As shown in Figs. 7, 12, and 13, this block 89 is held by guides or gibs 93 in a position against the lower face of the wall 51 and so as to slide radially relative to the axis of the shaft 48. As shown in Fig. 7, the block 89 is disposed above the rightward or outer end 86 of the lever 54 and is adapted to have a reciprocating movement in radial direction limited by a pin 94 which projects downwardly from the wall 51 into a slot 95 in the block 89. A spring 96 is secured by means of a support 97 in such position that it will press the block 89 radially inwardly toward the shaft 48. The lever 54 is shown with a squared hole 98 through which a pin 99 of square cross section projects, this pin having a knife edge 101 formed on the upper end thereof for engagement with the grooves or serrations 92 of the block when the block 89 is moved inwardly from the position in which it is shown in Figs. 7 and 12 to the position thereof shown in Fig. 13. The pin 99 is resiliently supported on a spring 102 so that it may move downwardly when the block 98 engages the knife edge 101 formed at the upper end thereof.

Between the block 89 and the secondary cam 65 a V-shaped yoke 104 is pivoted on a screw 105 which threads upwardly into the wall 51. This yoke 104 has a cam follower 106 at the forward end thereof for engaging the secondary cam 65 and has a circular formation 107 at the opposite end thereof for engagement with the forward edge of the block 89. The cam 65 has four lobes 108 disposed at angles of 90° and being of such character that during the time the cam follower 74 is moving inwardly and outwardly, and likewise during the time that the arm 54 is swinging, the cam follower 106 will be forced rightwardly as shown in Fig. 12, so that the block 89 will be forced rightwardly against the pressure of the spring 96. During the times the lever 54 is to remain stationary, the cam follower 106 moves leftwardly into a space between two adjacent lobes 108 of the cam 65, as shown in Fig. 13, permitting the yoke 104 to rotate leftwardly so that leftward movement of the formation 107 at the rightward end of the yoke 104 will permit the block 89 to be moved leftwardly by the spring 96 so as to carry a serration 92 of the block 89 into engagement with the pin 99. Should there be any unevenness in the faces of the cam lobes 66, 67, 68, and 69 of the primary cam 64, the motion thereby transmitted to the cam follower 74 will be absorbed by the spring 77, since the lever 82 is at this time held immovable by reason of its connection to the locked lever 54.

The cams 64 and 65 are driven by, and in synchrony with, the drive mechanism of the camera 20 by use of the following parts. As shown in Fig. 7, a bevel gear 109, connected to the upper end of the shaft 58, is engaged by a bevel pinion 111 which is secured to the inner end of a shaft 112 which projects through the leftward side wall 45 of the chamber 42 at a point close to the wall 51, and is supported by means of a bearing 113 carried in an opening 114 in the side wall 45. A cover member 115 may be secured in the lower left-hand corner of the chamber 42, by means of screws 116, so as to form a chamber 117 for the gears 109 and 111. As shown in Figs. 2 and 6, the shaft 112 projects leftwardly from the casing 26, and the leftward end 118 thereof projects into a gear case 119 formed as a part of an adaptor 121, which is insertable between the camera motor 122 and the motor support 123 of the camera 20. As shown in Fig. 6, this adaptor 121 has a main casing 124 equipped with a flange 125 adapted to engage the outer face 126 of the motor support 123, and a flange 127 against which the flange 128 of the motor 122 may be secured. By means of bearings 129 and 131, the main casing 124 carries an extension shaft 132, the inner end 133 of which connects to the driven shaft 134 of the usual mechanism for intermittently moving the film in the camera, the outer end 135 of the shaft 132 being so formed that it will engage the shaft of the motor 122. The shaft 132 has a screw or worm 136 thereon which engages a worm wheel 137 mounted, as shown in Figs. 6 and 8, on a shaft 138 which projects forwardly from the main casing 124 of the adaptor 121 through a tubular extension 139 into the gear case 119 wherein a bevel pinion 141 is secured to the end of the shaft 138 so as to engage a bevel gear 142. The bevel gear 142 has a bore 143 through which the shaft 112 may slide, and is provided with a key 144 adapted to engage a keyway 145 which extends some distance along the shaft 112. The worm 136, worm wheel 137, and the bevel gears 109, 111, 141, and 142 are so proportioned that the cam shaft 58 will be rotated in a desired synchronism with the mechanism of the camera. When the casing 25 is moved leftwardly from the full line position in which it is shown in Fig. 2 to the position in which it is shown by dotted lines 146, so as to bring the camera lens 24 into alignment with the range finder or focusing attachment 147 thereof, the gear case 119 and the gear 142 therein slide leftwardly along the leftward portion 118 of the shaft 112 to the position indicated by dotted lines 148.

It is a further feature of the invention to provide means of adjustment whereby the angle of swing s, Fig. 3, of the refracting member 34 may be varied, thereby changing the degree of refraction of light rays passing from the object into the camera to a desired value. This result we accomplish, as best shown in Figs. 7, 12, and 13, by supporting the pivot means 83 so that it may be moved along the fulcrum lever 82. As shown in Figs. 11 and 12, the lever 82 has a slot 150 between side bars 151 and 152. A square block 153 is disposed in the slot 150 and is adapted to be clamped in any desired position in the slot 150 by means of a clamping screw 154 which passes through a longitudinal channel 155 in the side bar 152, into threaded engagement at 156 with the block 153, as shown in Fig. 11. A pivot pin 157 projects vertically through an opening 158 in the block 153, and the ends thereof are supported by arms 159 and 161 which project laterally from a traveling block 162. The block 162 has a threaded opening 163, through which a lead screw 164 is threaded, and in the lower part of the block 162 there is a slot 165 in which a guide bar 166 extends. The lead screw 164 projects longitudinally within the forward part of the chamber 56 and projects through a body 167 formed on a side wall 168 of the chamber 56. For rotation of the screw 164, a knob 169 is provided on the outer end thereof, and a locking screw 171 provided with a knob 172 is located at the body 167 where it is operative to clamp the screw 164 against rotation. As shown in Figs. 9, 10, 12, and 13, a temporary locking means 173 is provided for the lever 82 to hold the same stationary while the traveling block 162 and the pivot means 83 are moved relative to the lever 82. This locking means 173 consists of a pin 174 which passes downwardly through an opening 175 so positioned that the lower end 176 of the pin 174 may be moved downwardly into engagement with an opening 177 in the forward end 81 of the lever 82. As best shown in Fig. 10, this pin has an annular groove 178 which is engaged by a flat spring 179 which is secured by a screw 181 to the wall 51. This spring 179 exerts a pressure tending to move the pin 174 downwardly, and the pin 174 is normally held in raised position by means of a small cotter pin 182 placed in the upper part of the pin 174 in such position that the projecting ends thereof will rest upon abutments 183, but which may be lowered into a diametral slot 184 when the pin 174 is rotated through an angle of 90° from the position in which it is shown in Fig. 10.

A change in the position of the pivot means 83 is accomplished as follows: The camera mechanism is operated so as to bring the lobe 66 or 67 into engagement with the follower 74 so that the lever 82 will be brought into an intermediate position as shown in Fig. 12. The pin 174 is then rotated to bring the cotter pin 182 into alignment with the slot 184, thereby dropping the pin 174 so that the lower end 176 thereof will engage the opening 177 of the lever 82. A cover 185, Fig. 6, forming a part of the top wall of the chamber 56, is removed to provide access to the clamping screw 154, and this clamping screw 154 and also the clamping screw 171 are loosened, whereupon rotation of the lead screw 164 may be employed to cause movement of the traveling block 162 and the pivot means 83 in lengthwise direction relative to the lever 82, so that the block 153 of the pivot means 83 may be brought to a desired new position between the ends of the lever 82, thereby changing the fulcrum point of the lever 82, with the result of a corresponding change in the swing of the refracting member 34. When the block 153 is brought into a desired new position of operation, the clamping screws 154 and 171 may be retightened, whereupon the locking pin 174 may be lifted and rotated through an angle of substantially 90° so that the engagement of the ends of the cotter pin 182 with the abutments 183 will hold this pin 174 in the raised position in which it is shown in Fig. 10.

We claim as our invention:

1. An attachment for a motion picture camera having a film moving mechanism for bringing the frames of a motion picture film consecutively into line with the optical axis of the lens of such camera, including: a support; means for securing said support to a camera in a plane ahead of the lens of the camera; an optical flat refractory member; pivot means on said support supporting said refractory member in a position crossing said optical axis of said lens, said pivot means defining an axis of rotation for said refractory member disposed at an angle to said optical axis; a lever connected to said refractory member; a cam for swinging said lever rightwardly and leftwardly; means forming an operative connection between said cam and said lever whereby to so swing said lever; and drive means for said cam, said drive means having operative connection with said film moving mechanism of said camera and rotating said cam in timed relation to the movement of said film in said camera.

2. An attachment for a motion picture camera having a film moving mechanism for bringing the frames of a motion picture film consecutively into line with the optical axis of the lens of such camera, including: a support; means for securing said support to a camera in a plane ahead of the lens of the camera; an optical flat refractory member; pivot means on said support supporting said refractory member in a position crossing said optical axis of said lens, said pivot means defining an axis of rotation for said refractory member disposed at an angle to said optical axis; a lever connected to said refractory member; a cam for swinging said lever rightwardly and leftwardly; means forming an operative connection between said cam and said lever whereby to so swing said lever, said connecting means including cooperating parts secured together in adjustable relation whereby the angle of swing of said lever may be varied; and drive means for said cam, said drive means having operative connection with said film moving mechanism of said camera and rotating said cam in timed relation to the movement of said film in said camera.

3. An attachment for a motion picture camera having a film moving mechanism for bringing the frames of a motion picture film consecutively into line with the optical axis of the lens of such camera, including: a support; means for securing said support to a camera in a plane ahead of the lens of the camera; an optical flat refractory member; pivot means on said support supporting said refractory member in a position crossing said optical axis of said lens, said pivot means defining an axis of rotation for said refractory member disposed at an angle to said optical axis; a lever connected to said refractory member; a cam for swinging said lever rightwardly and leftwardly; means forming an operative connection between said cam and said lever whereby to so swing said lever, said connecting means including co-operating parts secured together in adjustable relation whereby the angle of swing of said lever may be varied; drive means for said cam, said drive means having operative connection with said film moving mechanism of said camera and rotating said cam in timed relation to the movement of said film in said camera; and locking means operating to hold said lever during the periods in which it is immovable.

HAROLD A. ADAMS.
RALPH D. LEMERT.

---

CERTIFICATE OF CORRECTION.

Patent No. 2,146,135.  February 7, 1939.

HAROLD A. ADAMS, ET AL.

It is hereby certified that error appears in the printed specification of the above numbered patent requiring correction as follows: Page 1, first column, line 22, after the word "have" insert images which are laterally offset with relation; and that the said Letters Patent should be read with this correction therein that the same may conform to the record of the case in the Patent Office.

Signed and sealed this 21st day of March, A.D. 1939.

Henry Van Arsdale.

(Seal)   Acting Commissioner of Patents.